United States Patent [19]

Kingham et al.

[11] Patent Number: 4,721,622
[45] Date of Patent: Jan. 26, 1988

[54] SHELF STABLE, FILLED FOOD AND METHOD OF MANUFACTURE

[75] Inventors: Clive G. Kingham, Amersham; Malcolm Caine, Cookham; Valerie J. Duffin, Marlow Bottom, all of England

[73] Assignee: United Biscuits (UK) Limited, Edinburgh, Scotland

[21] Appl. No.: 736,317

[22] Filed: May 21, 1985

[30] Foreign Application Priority Data

May 25, 1984 [DE] United Kingdom ............ 8413398
Feb. 16, 1985 [DE] United Kingdom ............ 8504040

[51] Int. Cl.⁴ ............................................. A21D 13/08
[52] U.S. Cl. ...................................... 426/94; 426/128; 426/283; 426/496; 426/556
[58] Field of Search ............... 426/94, 95, 128, 496, 426/275, 556, 283, 92

[56] References Cited

U.S. PATENT DOCUMENTS 3,656,967 4/1972 Barton et al. ........................ 426/94
3,922,353 11/1975 Bernotavicz ......................... 426/94
4,207,348 6/1980 Vermilyea et al. ................. 426/243
4,517,203 5/1985 Levine et al. ........................ 426/94

FOREIGN PATENT DOCUMENTS 6845 of 1892 United Kingdom ............... 426/275

Primary Examiner—George Yeung
Attorney, Agent, or Firm—Young & Thompson

[57] ABSTRACT

A snack food product comprises a filling (107) wholly enclosed in a bread-like casing (100), optionally with a barrier layer (106) disposed between the casing (100) and the filling (107). A sterile moisture-proof wrapping (108) wholly encloses the edible part (100, 106, 107) of the product. The snack food product (100, 106, 107, 108) is storable at normal temperature for long periods, e.g. several months. The product can be made by assembling the components before or after a shaped dough component is baked to form the bread-like casing (100) and can be prepared for consumption by a heating step carried out before or after the edible part (100, 106, 107) is removed from the wrapping (108).

22 Claims, 7 Drawing Figures

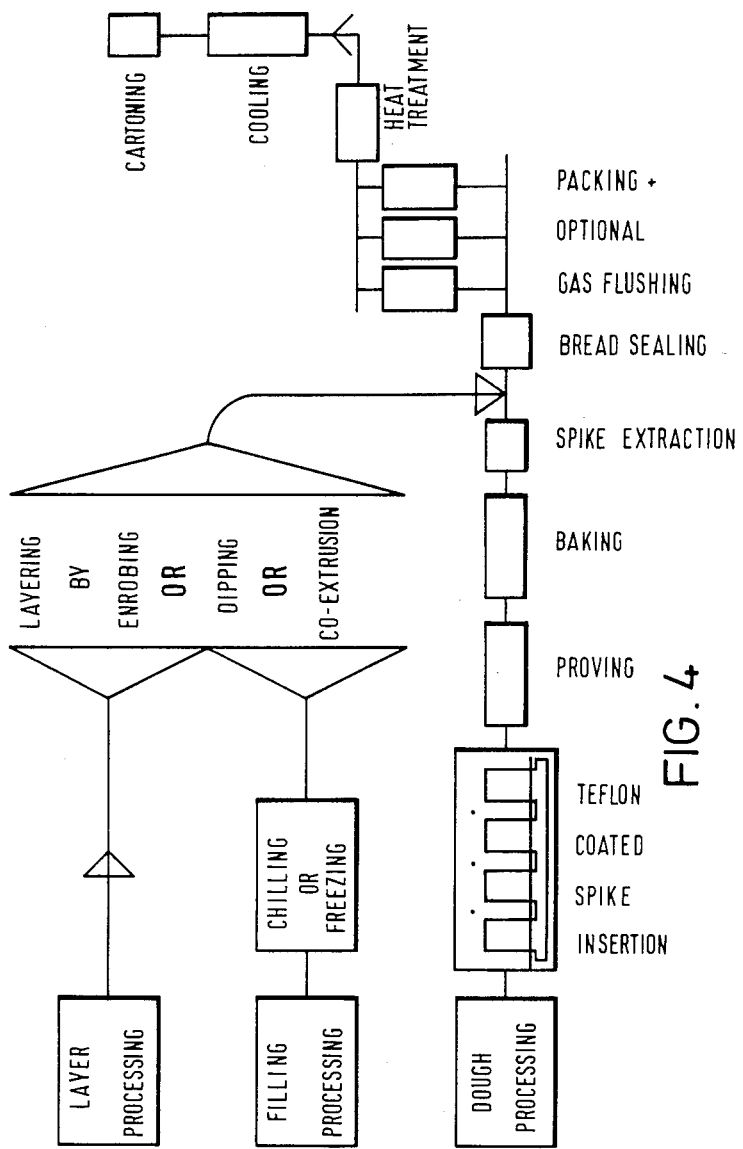

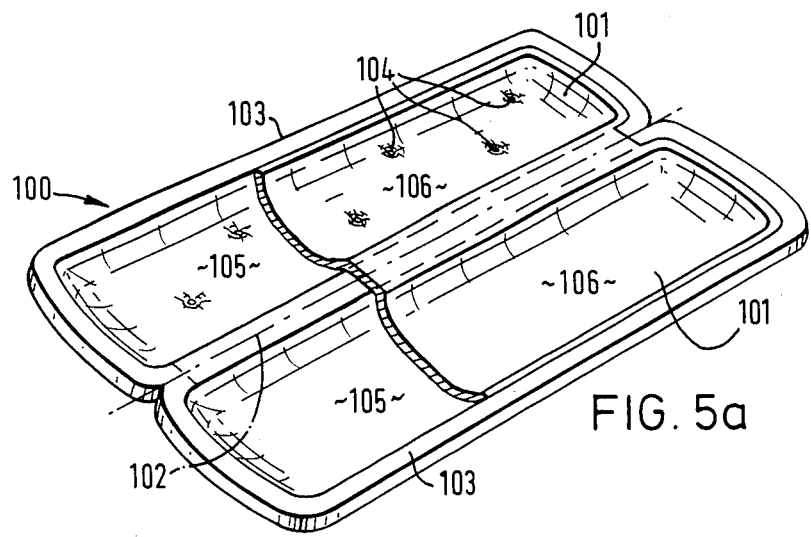
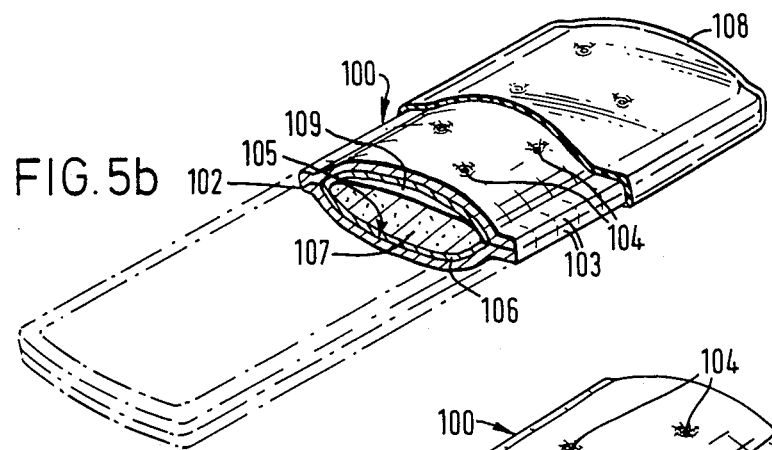
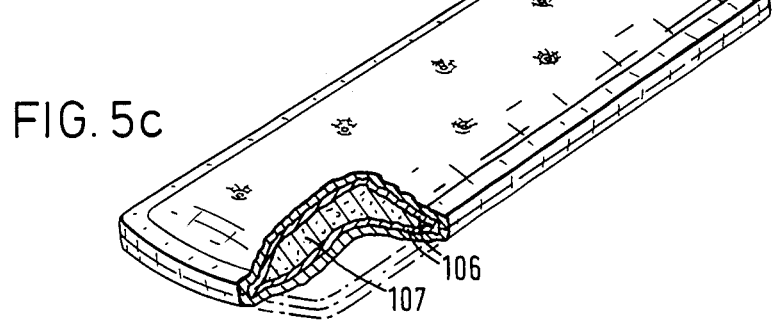

SHELF STABLE, FILLED FOOD AND METHOD OF MANUFACTURE

This invention relates to food products and is concerned, in particular, with precooked food products which are intended to provide satisfying and readily-consumable food items, involving minimal preparation for consumption. One or a number of food products according to this general concept can conveniently form all or a major part of a quick meal or snack; food products are usually regarded as "snack" items if they are intended to be eaten while held in the hand and if their preparation in order to be eaten merely involves the opening or removal of wrapping or packaging material. One form of snack product which is very widely known and used is the sandwich, in the closed form, consisting of a filling between two slices of bread. Sandwiches can be handled very conveniently both when being prepared for consumption and also while being eaten, because the bread provides the entire exterior surfaces and prevents the filling from contacting the hands. It is common practice, both in the home and in commercial locations supplying snacks, for sandwiches to be warmed or toasted in preparation for consumption, especially when the fillings are savoury in nature, because this enhances the flavour and other eating characteristics. However, the preparation of sandwiches requires a variety of component materials, all in a fresh state, and prepared sandwiches rapidly become stale. For these reasons, the commercial supply of sandwiches, whether plain or toasted, is labour-intensive, expensive and potentially wasteful, as usually preparation either takes place to order or it involves the immediate wrapping of individual sandwiches, although even packaged sandwiches deteriorate in a few days. Chilling or freezing can be used to store sandwiches for several days or months, respectively, but the wide variety of components in them react in different ways and such products are seldom if ever satisfactory when returned to ambient temperature for consumption.

In view of the high and increasing popularity of snack products, there is a considerable demand for a product which meets a number of criteria, which are not fulfilled by the conventional sandwich, and there is thus great commercial potential in the manufacture and supply of such a snack product. The main criteria to be satisfied by a product according to this concept are as follows:

(1) the product should be microbially stable and therefore capable of storage;

(2) the product should be storable at normal ambient temperature, so that the provision of special containers such as chill cabinets or freezers is unnecessary;

(3) the product should remain in a satisfactory state, under ambient temperature storage conditions, for a substantial length of time, which can be regarded as a period of up to 3 months and, preferably, for a period of 4, 5 or 6 months or even longer;

(4) preparation of the product for consumption, when removed from storage, should involve only very simple and easy steps, including the removal of the product from its wrapping or packaging material or vice versa and, if desired, a heating or cooking step, which can be carried out either before or after separation of the product from its wrapping or packaging material.

It has now been discovered that snack food products can be made which meet these criteria and which can also have other desirable and advantageous features and, moreover, methods of manufacture of such products have also been devised, together with methods for the preparation of such products so as to make them ready for consumption.

According to an aspect of this invention, a snack food product comprises:

(a) a bread-like casing made by subjecting a yeast-raised or other dough to a first heating step;

(b) a filling located inside and wholly enclosed by the casing, the snack food product formed by the casing and the filling being subjected to a second heating step; and (c) a sterile moisture-proof wrapping wholly enclosing the snack food product, whereby the wrapped product is microbially stable and so is capable of storage at normal ambient temperature for a substantial length of time.

Preferably, the casing and the filling are formulated so that their respective moisture contents result in water activity values for these components which undergo no detrimental change during the period of storage. In one form of wrapped snack product of the invention, the water contained in the various components of the product is allowed to equilibrate throughout the product, the water activity values having been chosen so that this equilibration has no detrimental effect on the product. However, in a preferred form of the wrapped snack product of the invention, this is achieved by providing, between the inside surface of the casing and the filling, an intermediate edible barrier layer which prevents or minimises the migration of water between the other components of the product. Preferably, the water activity of the casing is in the range from 0.60 to 0.95 and, more preferably, in the range from 0.85 to 0.95. The water activity range for the filling may be from as low as 0.20 or 0.40 to 0.99 but is preferably in the range from 0.90 to 0.99. If provided, the barrier layer has a water activity which, as manufactured, is in the same range as that of the filling. The water activity of the optional barrier layer may change during storage, but it has been discovered that any such change need not significantly affect the water activity values of the casing and filling components nor the storage stability of the product.

According to another aspect of the invention, a method of manufacture of a storage-stable snack food product comprises:

(a) forming a closable bread-like casing by shaping a yeast-containing or other dough;

(b) subjecting the shaped dough piece to proving and then to a first heating step;

(c) depositing a filling composition upon the shaped and heated dough piece;

(d) closing the dough piece so that the filling composition is wholly enclosed within the casing;

(e) subjecting the resultant closed product to a second heating step; and, (f) before or after the heat-treated product undergoes cooling to normal ambient temperature, wholly enclosing it in a sterile moisture-proof wrapping, whereby the wrapped product is rendered microbially stable and so is capable of storage at normal ambient temperature for a substantial length of time.

Where the snack food product formed by this method includes a barrier layer disposed between the inside surface or surfaces of the casing and the filling, such barrier layer is preferably provided by depositing a barrier composition upon the interior of the casing before carrying out step (c) above. A barrier composition can either have the requisite properties per se or can acquire them when the product undergoes the subsequent manufacturing steps. The barrier layer can also be such that its ability to preclude moisture migration is lost when the snack product is heated or otherwise treated to make it ready for consumption.

According to a further aspect of the invention, a method of manufacture of a storage-stable snack food product comprises:

(a) forming a bread-like casing by shaping a yeast-containing or other dough into a tubular component, which preferably is closed at one end;

(b) subjecting the tubular component to proving and then to a first heating step;

(c) inserting a shaped filling component into the tubular component before or after the first or both of the operations of step (b);

(d) closing the or both open ends of the casing so that the filling component is wholly enclosed within the casing;

(e) subjecting the resultant closed product to a second heating step; and (f) before or after the heat-treated product undergoes cooling to normal ambient temperature, wholly enclosing it in a sterile moisture-proof wrapping, whereby the wrapped product is rendered microbially stable and so is capable of stroage at normal ambient temperature for a substantial length of time.

In either embodiment of the method as set out above, both of the first and second heating steps can cause the dough pieces to undergo baking, i.e. a prebaking step followed by a final baking step, or one can be a baking step per se, while the other is a different kind of heating step, such as is effective to subject the products to retorting, pasteurization, sterilization or some other effect of heat treatment. If the components include a barrier layer and the mixture for forming this and the filling component are kept in a hot state after being made and heated, they can be processed into the filling component step (c) above by a co-extrusion process.

Where the snack food product formed by this latter method includes a barrier layer disposed between the inside surface or surfaces of the casing and the filling, such barrier layer is preferably provided by applying a barrier layer composition to the exterior surfaces of the shaped filling component before carrying out step (c) above. The barrier composition can again have any of the desirable characteristics indicated above.

According to another aspect of the invention, a method of preparation of a snack food product in accordance with this invention comprises removing the product from storage and heating it to a temperature suitable for consumption, the heating step being carried out before or after the wrapping is removed from the product. The heating step can be conducted at such a temperature and for such a time as to subject the snack food product to a cooking step, i.e. the product is not merely taken to an elevated temperature, but one or more of its components undergo modification involving irreversible changes.

Snack food products having a casing and a filling bonded together are disclosed in GB-A- No. 1510996 and comprise a ready-to-eat product in elongate form, having a casing of bread bonded to a core, i.e. the bond is sufficiently strong to prevent separation of the bread from the core during handling at ambient temperature. The bread casing can have its ends open or closed and, in order to give the product a good storage life, this casing has a water content of less than 15% by weight. The filling has a good storage life, defined as a period of at least 6 months in hermetically-sealed packs at not more than 25° C. The bread casing preferably has a moisture content below 10% and most preferably below 5% by weight and the product can undergo a second baking step, i.e. in addition to that used in making the bread casing, in order to achieve such moisture contents. However, products prepared in this way can be hard and unappetizing and this manufacturing technique is entirely inapplicable to precooked unbonded products of the kind to which this invention relates.

Another problem with known products is caused by the diffusion of moisture from the filling to the casing during storage. Even with sterilized products tightly enclosed in moisture-proof wrappings, moisture can diffuse from the filling into the casing. This can make the casing unappetising, whilst another possible disadvantageous effect is softening and loss of strength of the casing. Moreover, such casings are only partially restored to a satisfactory condition by subjecting the product to a baking step in preparation for consumption. In order to deal with the problem of moisture migration, DE-A- No. 2556254 describes the provision, between the filling and the casing of such a product, of an impermeable but water-soluble edible intermediate layer, made from film-forming substances used in the food and pharmaceutical industries, e.g. maize protein or sodium alginate.

In a product according to the invention, the casing is essentially bread-like and thus is made from a yeast raised or other bread dough, such as a soda-containing dough. It forms a complete enclosure for the filling component, so that it is desirable to provide apertures or other means in the casing for the escape from the enclosure of steam or vapour generated in manufacture. The moisture content of the dough from which the casing is made, the way this changes as manufacture proceeds and the resultant humidity of the casing component are such that, in the product, the water activity of the casing is from 0.60 to 0.95. Preferably, the water activity lies in the range from 0.85 to 0.95, and, more preferably, in the range from 0.88 to 0.93.

The filling can be made from an extremely wide range of components and can be sweet or savoury in flavour and, in practice, of any specific composition, subject to the fact that it is capable of being heatsterilized or pasteurised. The water activity range may be from as low as 0.20 or 0.40 to 0.99 but is preferably in the range from 0.9 to 0.99, and more preferably in the range from 0.93 to 0.98 and most preferably around 0.95 to 0.96. It is also possible to use fillings with water activities within the broad range which are somewhat lower than the preferred values indicated. This applies especially to essentially acid fillings. Satisfactory snack products can have water activities in the range from 0.9 to 0.93 or 0.94, i.e. the lower part of the overall range, and such fillings have been found to be suitable for incorporation in products according to this invention and, especially, if they are so formulated as to have a pH in the range from 3.5 to 7.0. Certain fillings such as fermented sausages, salami and heavily salted fish will however have water activities in the range of 0.70 to 0.90 and some nut fillings such as pecan nuts and walnuts will have water activities of around 0.20. These latter fillings are preferably mixed with other filling materials to provide water activities of, say, around 0.50.

The wrapping can be applied to the manufactured snack product before, during or after it undergoes cooling to ambient temperature. The wrapping also needs to be capable of withstanding heat-treatment, such as occurs in pasteurization, and can be of any suitable shape and form. For instance, it can be tubular and of such a size as to fit over the completed and generally elongated bar-like products, the ends of the wrapping then being closed around the product. Alternatively, the wrapping can be strip-shaped and can be applied by being helically wound round the product, again having the ends closed so as to achieve the desired complete containment of the product. Any moisture-proof impermeable sheet material suitable for sterilization and compatible with food products is suitable for use as the wrapping material. Essentially, the purpose of the wrapping is to provide the product with a protection which is proof against gases, liquids, especially moisture, light and micro-organisms, over a substantial length of time.

The barrier layer which is or may be incorporated in the product, between the casing and the filling, serves the purpose of preventing moisture migration in the desired way, so that the other components undergo only slight change in their water activity values during storage. The water activity of the barrier layer typically lies in the range from 0.9 to 0.99, although it may change during storage, typically to a lower value, but without any such change adversely affecting the water activities and therefore the storage stability of the other components of the product.

The snack food product of the invention preferably has the shape and appearance of an elongate closed sandwich, the bread casing being, in one embodiment, an integral hollow component or in another embodiment, two or more slices bonded at the edges, with the filling being disposed within the bread casing. The wrapped or packaged food products of the invention can be stored for several months at normal ambient temperature without deterioration, i.e. at least for 3 months and up to 6 months or longer, and can simply be heated, e.g. in a conventional or microwave oven just before eating. The products have sufficient stability so that no chemical nor microbial deterioration occurs during storage and they maintain an appetizing and attractive appearance after several months in a moist atmosphere at room temperature, e.g. 10° to 25° C., and under natural or artificial light. During the storage period, the migration of water from the filling to the casing is minimized or eliminated and no substantial change in relative humidity occurs.

In order that the various aspects of the invention can be fully appreciated, various preferred features of the products and processes according to the invention are described below and are also shown, by way of illustrative example only, in the accompanying diagrammatic drawings; also, embodiments of the invention are described in the appended Examples.

In the drawings:

FIG. 4 shows in a similar style to FIG. 3, a number of ways of conducting embodiments of the method of the invention in which post-bake assembly of the components takes place; both of FIGS. 3 and 4 thus also show in diagrammatic and simplified form the types of apparatus for use in carrying out manufacture of products according to this invention;

FIGS. 5a to 5c show in perspective view, partly broken away, various stages of manufacture of a typical product according to this invention.

Figure 1:
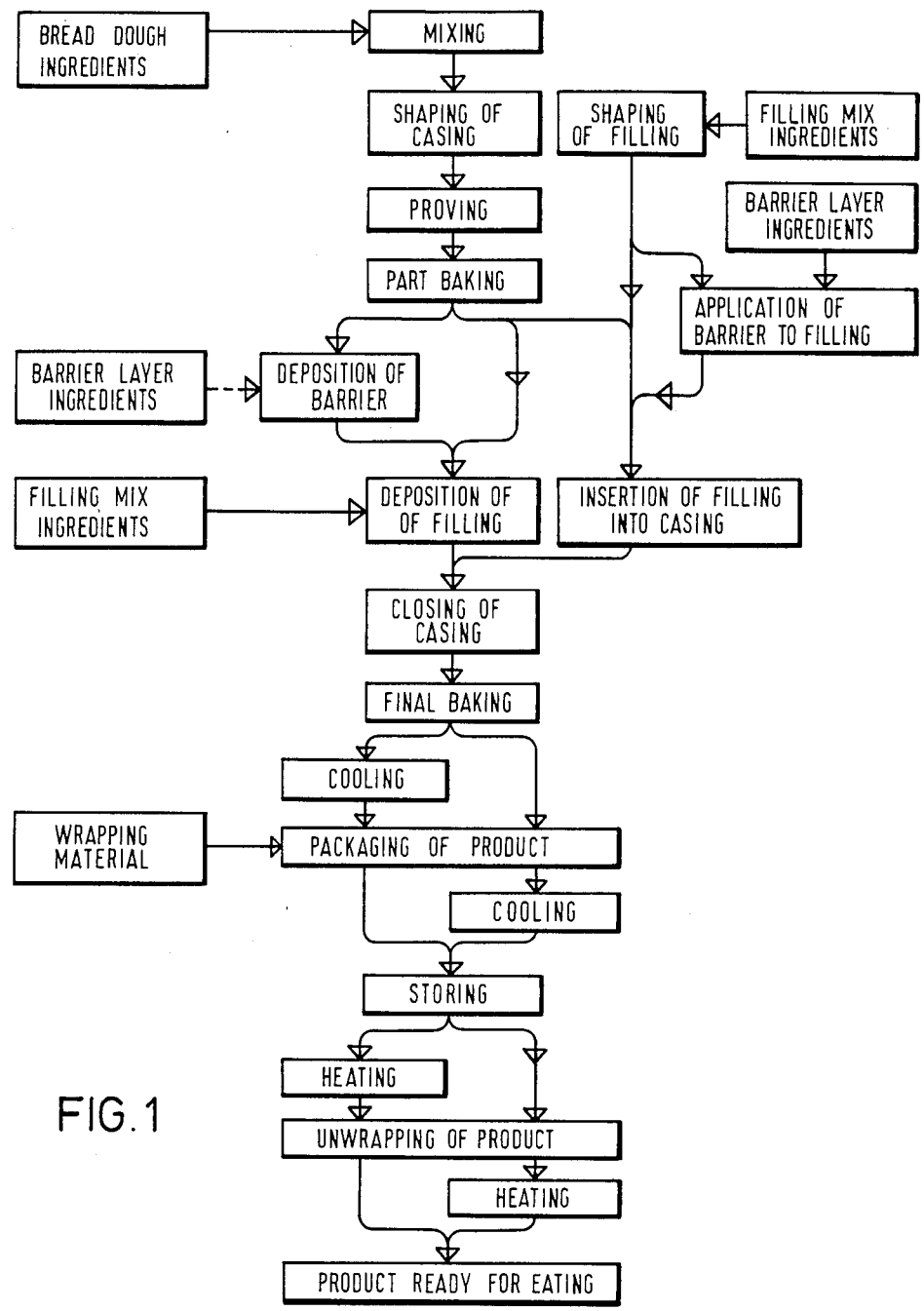
FIG. 1 shows in flow-sheet form a number of embodiments of the processes of manufacture and preparation for consumption of the snack food products of the invention.

Referring to FIG. 1, one form of process of the invention involves the successive steps of mixing appropriately the bread dough ingredients, to form a yeast-containing dough for making the casing, followed by shaping the dough by any of a variety of means, proving the dough to allow the yeast to raise the dough and then subjecting the casings to a first heating step so as to effect partial baking and thereby deactivate the yeast and produce casings of the desired form. The filling mix ingredients are combined to form the filling and this is then deposited upon the casings. If these are made in open form, suitable for subsequent closure, the filling is deposited upon one part of the casing and this is then closed in the next step. Where a barrier layer is included in the product, this can conveniently be provided, as indicated on the left side of FIG. 1, by mixing together the barrier layer ingredients, if required, and depositing the barrier composition upon those surfaces of the open casings which will be inside the final products, before the filling is deposited on to the appropriate part of each casing. Where mixing of the bread dough ingredients is shown as the first step at the top of the flow-sheet, it will be appreciated that mixing and heat processing of the barrier layer ingredients will also take place and that these operations are notionally included in FIG. 1 prior to each of the four deposition steps shown. When closed, the casing is completely covered internally by the barrier layer, if provided, and the casing completely encloses the filling. A further heating step is then carried out, to effect final baking, and the products are then cooled and packaged in wrapping material, as indicated at the left side of FIG. 1, or these steps are carried out in the reverse order, as indicated at the right side. The products are then ready for storage. FIG. 1 also illustrates the simple steps needed when the products are to be consumed, which involve removing them from storage and subjecting the snack products, if desired, to a heating or warming step followed by removal of the packaging, as indicated at the left side of FIG. 1, or these two simple steps can be carried out in the reverse order, as indicated at the right side. In either case, the product is then ready for eating.

An alternative to this form of process is also included at the right side of FIG. 1. Shaping of the casing typically involves the formation of tubular components, which may be open at both ends or at one end. Instead of being deposited, portions of the filling, made by combining the filling mix ingredients, and designed to fit inside the shaped tubular casing components, can be shaped and inserted therein. If a barrier layer is desired, it can be applied to the shaped filling components. Whether or not provided with a barrier coating, the shaped fillings are then inserted into the casings and the open end or both open ends are then closed. The products then undergo the remaining steps of one or other of the various processes of manufacture and preparation for consumption already described.

Figure 2:
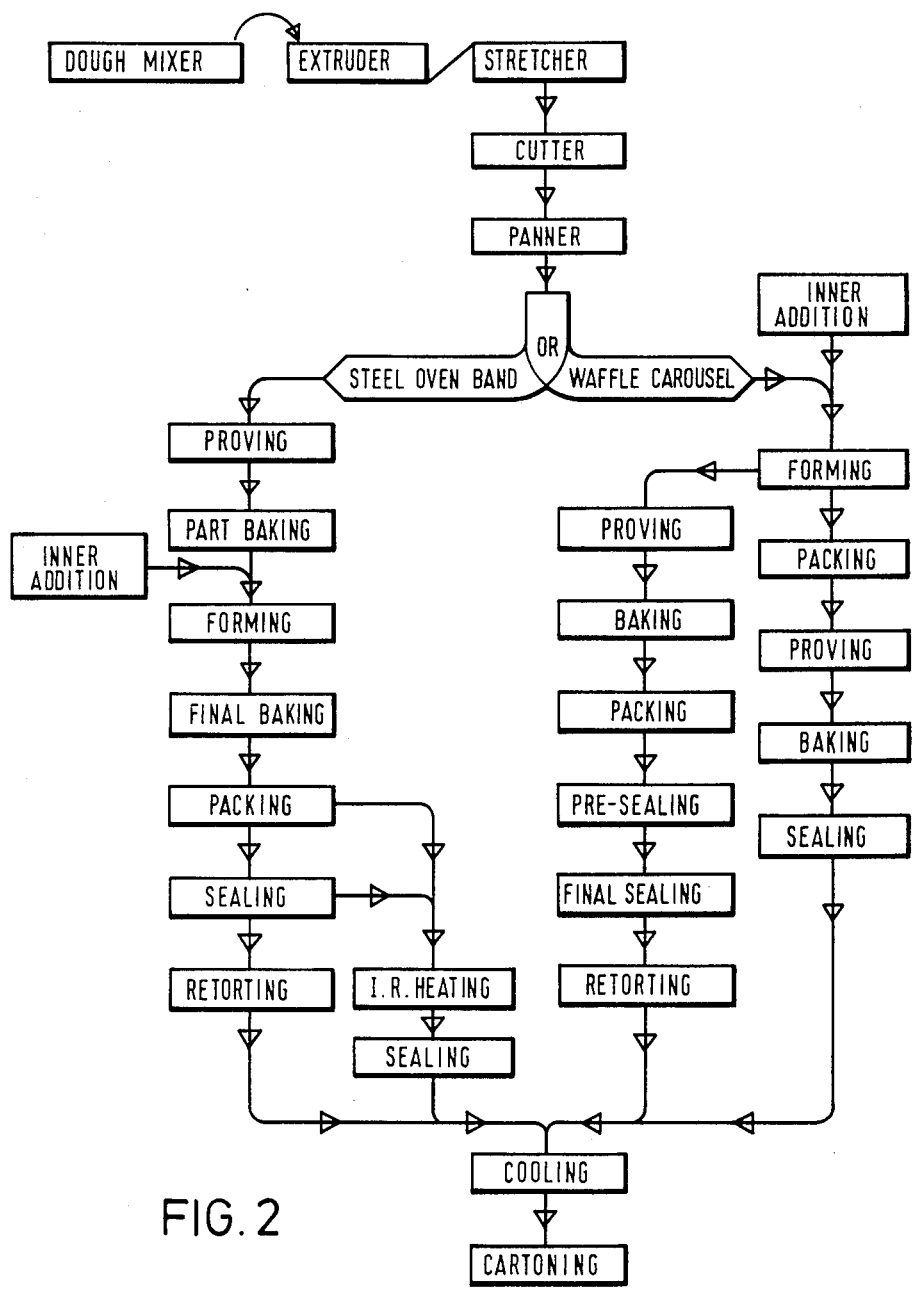
FIG. 2 shows in flow-sheet form a number of ways of carrying out the embodiment of the method of the invention in which assembly of the product components takes place before the baking step or steps.

Referring to the process illustrated diagrammatically in FIG. 2, this shows the successive units of apparatus and the steps involved in manufacturing snack food products comprising wrapped encased fillings having an optional intermediate barrier layer, using pallet-like or otherwise shaped casings which receive the barrier layer and then the filling by deposition steps, followed by pallet closure. In FIG. 2, the first three units of apparatus effect related operations on the dough which is used to manufacture the casing component of the product. As shown, a dough mixer to which the appropriate ingredients are supplied, as described in detail below, for instance in the Examples, produces the dough which is then transferred to an adjacent extruder or sheeter apparatus which forms the dough into a continuous flat and relatively wide layer by a sheeting-out operation. Reduction of the thickness of the dough sheet is then effected in the associated stretcher, the output from which is thus a dough of the appropriate consistency and other physical characteristics, in the form of an endless sheet of the desired thickness. This passes to a cutter where shaped components such as pallets are formed and are conveyed by continuous operation of the transport process involved throughout the apparatus to a panner, where the shaped pieces of dough are set out in the appropriate spatial location and relationship. Each pallet can consist of a single component or a multiple component of one or a number of casings of the eventual product. The various methods of the invention illustrated in flow sheet form in FIG. 2, from this point, can involve either operation upon a conveyor in the form of a steel oven band or, alternatively, operation upon a conveyor in the form of a waffle carousel. Essentially, each of these production components takes the form of a conveyor comprising an endless loop and traversing a path which may be vertical with a forward advancing run over part of the endless loop path or horizontal involving a forward advancing run over part or all of the path traversed by the carousel.

As indicated on the left in FIG. 2, the casing components on the conveyor are first subjected to a proving step and then to a part-baking step, so that if the dough is raised by the incorporation of yeast in it this occurs in the proving step and is brought to an end in the part-baking step. Addition of the inner component of each product then takes place at this point, as illustrated in more detail in FIG. 3 described below, following which forming of the product consisting of closing of the filled casing typically by the use of the mechanisms and procedures involved in wafer making technology takes place. The closed and filled casings are then subjected to a final baking step after which packing takes place, that is to say application to the products of the water-impermeable wrapping material which forms an essential component of the product for subsequent storage purposes. A final heating step is involved and in one embodiment of the invention this is indicated in the flow sheet on the left-hand side as a retorting step. This would typically involve packing of the products into wrapping material consisting of foil laminated with a plastics material such as a polyamide (e.g. "Nylon") or polyethylene which is then capable of being subjected to a sterilization operation by heat treatment. Sealing of the packages can take place after insertion of the products into the retortable enclosures in the packing step per se, as division of the enclosing operation into separate packing and sealing steps enables steam or other vapour to escape from the packaged products prior to closure of the packages and their submission to the retorting step. After this, the products are taken through a cooling step prior to being packaged with others in cartons in a final cartoning step.

An alternative to a retorting step is an IR heating step in which infra-red radiation is directed against the packaged products before or after a sealing step and this has the effect of treating the surface of the product including therefore the wrapping material itself, the depth of effect of the IR heating step being dependent upon the intensity at and time during which it is carried out. Thus both a retorting step and an infra-red heating step are alternative forms of final heating step in the sequence of operations involved in manufacturing the products of the invention. After the IR heating step and the subsequent sealing step, if this has not been carried out prior to the IR heating step, again the products are subjected to cooling prior to final cartoning for transport and storage.

The pre-bake assembly operations so far described in relation to FIG. 2 involve proving and part-baking of the bread-like casings before addition of the inner components. In a number of alternative ways addition of the inner components can take place before the proving and baking steps, as indicated on the right hand side in FIG. 2. As the cut dough portions pass through the panner on to the oven band or waffle carousel, addition of the inner components takes place. In the embodiment illustrated on the right hand side of the flow sheet of FIG. 2, the assembled components then undergo forming, packing, proving, baking and optionally, a sealing step before undergoing final cooling and cartoning. These steps are essentially similar to those already described in connection with the embodiments illustrated on the left hand side of the flow sheet, with the exception that the baking step can be conducted so as to effect both de-activation of the yeast in the dough after proving and the requisite microbial stabilization of the products prior to the wrapping and sealing operations. As a further alternative, after forming of the assemblies in the way already described, proving followed by baking can take place before the packing step and in this case, a packing operation can be followed by what may be regarded as a pre-sealing operation in which the products are inserted into the immediate wrapping materials without these being closed until the subsequent final sealing step is undertaken. In this sequence of steps, a final retorting step can also be carried out.

In all of the embodiments described so far, microbial stabilization can be provided in other ways than the essentially heat-treatment operations of infra-red heating and retorting. For example, irradiation for instance with beta particles can be employed for this purpose, instead of a heating step.

Figure 3:
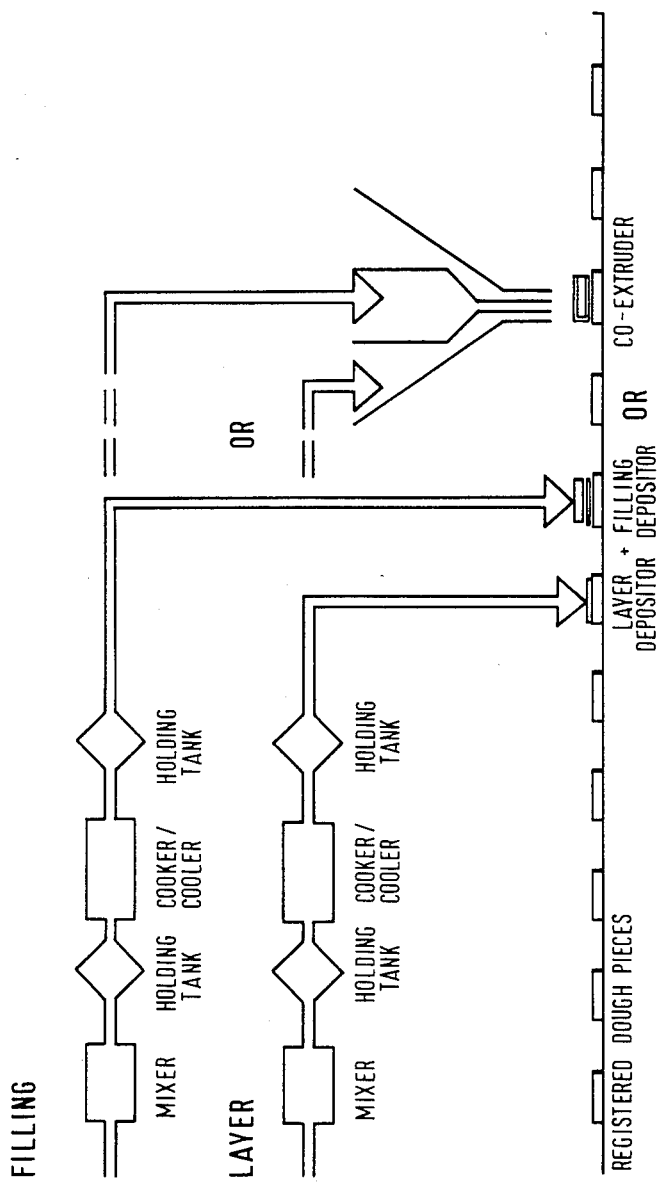
FIG. 3 shows, also in flow-sheet form, a number of forms of apparatus and the consequent method stages involved in the addition to the bread casings of the inner components, in the various forms of pre-bake assembly in FIG. 2.

As regards the addition of the inner materials in the various embodiments of pre-bake assembly modes of the process of the invention, described above in relation to FIG. 2, a number of methods are illustrated in FIG. 3, which shows in highly diagrammatic form and side view a number of apparatus units in relation to a conveyor indicated at the lower part of FIG. 3 and advancing from left to right as there shown. The dough pieces or pallets in appropriately registered spatial arrangement on the conveyor may have undergone proving and part-baking as indicated on the left hand side of FIG. 2 or may have been placed in appropriately registered form, directly after leaving the panner, on to the oven band or waffle carousel or other component comprising the conveyor. The layer used as the barrier component of the products is obtained by subjecting the appropriate ingredients to treatment in a mixer followed by a holding tank and then a cooker/cooler unit which is again followed by a holding tank. Then at an appropriate place in the path of forward movement of the conveyor with the dough pieces thereon, discrete measured quantities of the layer composition are deposited on to the dough pieces. In a similar operation, the filling component is produced by supplying the requisite ingredients to a mixer which is also followed by a holding tank, followed in its turn by a cooker/cooler unit and a further holding tank. Deposition of measured quantities of the filling material on to the dough pieces already having received the barrier layer can then take place, typically at the next station after the one where the depositor for the layer material operates. As an alternative to internal addition, in the pre-bake assembly operation of the apparatus and process of the invention, both the layer and filling compositions can pass through the mixer, holding tanks and cooker/coolers directly to a co-extruder apparatus, where the two compositions are deposited simultaneously on to the dough pieces in the appropriate mutual arrangement.

An alternative to pre-bake assembly is postbake assembly and this is illustrated diagrammatically, by a preferred embodiment shown in FIG. 4. As indicated at the lower part of the figure, the apparatus units and the steps carried out in them proceed from left to right and are initiated by the appropriate processing operations on the layer component, the filling component and the dough. The latter is then formed into shaped casing bodies, for instance by having coated mandrels or spikes, the coating being provided with a suitable non-stick material, such as polytetrafluoroethylene, e.g. "TEFLON", so that a plurality of bread casings are formed on the mandrels. These casings therefore are essentially tubular with a closed end, as first formed, the opposite end still containing the mandrel and therefore being open. The bread casing components on the mandrels are then taken through successive proving and baking stages to a further stage where the spikes or mandrels are extracted and the bread casings are then ready for insertion into their open ends, of the inner components of the products.

The processing of the filling will typically involve a chilling or freezing operation and then the filling components and the layer components are brought together by one of a number of techniques typically involving enrobing, dipping or co-extrusion. This therefore results in the production of assembled inner components and layer components which are then introduced into the proved and baked bread casings, following which the assembled products pass to a bread sealing station in which the open ends of the bread casings which have been formed on the spikes or mandrels are closed. Packing and an optional gas flushing step can follow sealing of the bread casings. Gas flushing is essentially control of the atmosphere in which the products are contained, the atmosphere being provided by an appropriate gas or mixture of gases. Typical gases are $CO_2$ and $N_2$ which are essentially inhibiting gases which have the effect of displacing any oxygen present so that a number of organisms such as putrifying bacteria are precluded from growth. In other gas flushing steps, the flushing gas comprises oxygen which is then present in the package at a predetermined level. In addition to incorporation into the post-bake assembly illustrated in FIG. 4, a gas flushing operation can be incorporated between packing and IR heating in the steps indicated in the pre-bake option shown in FIG. 2. Reverting to FIG. 4, following the packing and optional gas flushing steps, the products are subjected to a final heat treatment, cooling and cartoning.

The appearance of the product at various stages in the process described in relation to FIGS. 2 and 3 is shown in FIGS. 5a, 5b and 5c.

FIG. 5a shows a shaped bread pallet 100 comprising two similar elongaged shallow halves 101 joined along a central line 102. Each half 101 of the pallet 100 includes a peripheral flange 103 and closure of the pallet by hinging about the line 102 brings the flange 103 of one half 101 into contact with the flange 103 of the other, so that the pallet 100 can be closed to form the exterior casing of the product. The halves 101 of the pallet 100 or at least the half 101 which is intended to be uppermost after closure are/is preferably provided with vapour escape holes, such as are shown at 104. The interior surfaces 105 of the pallet halves 101 can be provided with an integral barrier layer 106, which can if desired extend over the mutually-contacting surfaces of the flanges 103.

FIG. 5b shows the closed casing 100, with the flanges 103 in contact and the barrier layer 106 covering the entire interior surfaces 105. The filling deposited upon the open pallet before closure to make the casing 100 is shown at 107 and a moisture-proof sterilizable food-compatible wrapping 108 is provided fully around the snack food product and, in this condition, the product is capable of storage, without refrigeration or deep-freezing, for extended periods of time, i.e. from 3 to 6 months or longer. A space 109 may be formed between the filling 107 and the part of the casing 100 containing the vapour escape holes 104.

FIG. 5c shows the product when separated from the wrapping 108 and heated ready for consumption. The barrier layer 106 may melt into the casing 100 or the filling 107 or both in this step and also the filling 107 may expand into contact with the casing 100, so that the vapour space 109 disappears.

The wrapping and sealing of the products in sterile envelopes or other packaging materials is preferably carried out under an appropriate inert atmosphere, e.g. $N_2$ or $CO_2$.

EXAMPLE 1

I. A bread-like dough was prepared by blending the following ingredients in a MORTON mixer:

| Ingredients | Weight (g) |
| --- | --- |
| Wholemeal flour | 500 |
| Dried gluten | 50 |
| Salt | 9 |
| Fat | 30 |
| Yeast | 30 |
| Milk powder | 7 |
| Sugar | 9 |
| Water | 310 |
| Ascorbic acid soln (1%) | 3.25 |
| Sodium diacetate (flavouring) | 1 |

Mixing took place for 4 min. at high speed at 25° C. The dough was then raised for 20 mm at 30° C., shaped upon bars into tubular form and then heated for 14 min at 210° in an oven.

A cheese filling composition was prepared by mixing and heating the following ingredients (% by weight)

| Ingredient | % by weight |
|---|---|
| Cream cheese | 40 |
| Double cream | 20.8 |
| Milk | 20.8 |
| Ground onions | 6.4 |
| Salt | 0.56 |
| Spices | 0.11 |
| Maize starch | 3.12 |
| Gelatine | 3.20 |
| Water | 4.8 |
| Total | 100 |

The filling mixture was then sterilized, frozen, divided into pieces to suit the bread casings and then dip-coated in a pan containing molten cheese. The cheese coating on the frozen filler pieces was about 2–4 mm thick. The pieces were inserted into the precooked bread casings and the latter were sealed, so that the coated filling was completely enclosed by the bread casing. Then the food products were sealed in sterile pouches under nitrogen.

EXAMPLE 2

A dough for making French bread was prepared from the following ingredients:

| Ingredients | % by weight |
|---|---|
| Wheat flour | 63 |
| Yeast | 3 |
| Salt | 1.5 |
| Sugar | 1.5 |
| Fat | 2 |
| Water | 29 |
| Total | 100 |

The dough was formed into casings and precooked as in the previous Example.

A filler composition was prepared from the following ingredients:

| Ingredients | Weight (g) |
|---|---|
| Yoghurt | 583 |
| Dried cream | 153 |
| Dried onion | 25 |
| Modified starch | 33 |
| Salt | 10 |
| Pepper | 0.3 |
| Dextrose monohydrate | 40 |
| Disodium dihydrogen pyrophosphate | 2.5 |
| Fat | 150 |
| Emulsifier | 5 |
| Gelatin | 25 |
| Water | 25 |
| Cooked bacon | 108 |
| Grated cheddar cheese | 134 |

A barrier layer was prepared to the following recipe:

| Ingredient | % by weight |
|---|---|
| Casein | 25 |
| Fat | 25 |
| Water | 45 |
| Emulsifier | 1 |
| Lactic acid | 1 |
| Salt | 2 |
| Emulsifying salts | 1 |

The filling was totally enclosed within the barrier layer by the use of a co-extruder, for example a co-extruder manufactured by Theon Company or Hutt GmbH, to produce a "rope" of covered filling. This rope was then "pinched" to form discrete elongate portions each having the barrier layer sealed to itself at both ends, with a portion of the filling included within the coating formed by the barrier layer. The portions were then combined with the bread dough in the manner described in Example 1, the bread being pre-cooked as described in Example 1 before combination.

The water activities of the components of the food products of Examples 1 to 4 were as follows:

| Example 1: | pre-cooked bread shells | 0.93 |
|---|---|---|
|  | cheese filler | 0.96 |
|  | molten cheese | 0.95 |
| Example 2: | pre-cooked bread shells | 0.93 |
|  | filling | 0.93 |
|  | barrier layer | 0.95 |

The above figures represent the water activities in the final product, after manufacture but before storage.

We claim:

1. A snack food product comprising:
   (a) an outer casing of a bread material having a water activity in the range from 0.60 to 0.95;
   (b) a filling component wholly enclosed by said casing and having a water activity in the range from 0.90 to 0.99, said casing and said enclosed filling having been rendered temporarily sterile; and
   (c) a sterile moisture-proof wrapping wholly enclosing said casing and said filling contained therein;
   said product being microbially stable and having a long shelf life at ambient temperature, said casing and said enclosed filling being microbially unstable when devoid of said wrapping.

2. A product according to claim 1, wherein said casing has a water activity in the range from 0.60 to 0.95.

3. A product according to claim 2, wherein said casing and said filling have respective moisture contents selected so as to result in water activity values for the casing and the filling within each corresponding said range and which undergo no substantial change during storage of the wrapped product.

4. A product according to claim 3, wherein said water activity values of the respective casing and filling components are selected within each said range so that equilibration of the water contained in the casing and in the filling takes place throughout the product without adversely affecting the product.

5. A product according to claim 1, and an intermediate, edible barrier layer serving to restrict migration of water between said casing and filling components of the product, said barrier layer being disposed between said casing and said filling.

6. A product according to claim 1, wherein said casing is an integral hollow component encasing said filling component.

7. A product according to claim 1, wherein said bread material comprises flour and yeast.

8. A method of manufacture of a storage-stable snack food product comprising a filling wholly enclosed in an outer casing component, comprising the steps of:
(a) forming an outer casing by shaping a piece of bread dough;
(b) subjecting said shaped dough piece to a proving step;
(c) depositing a filling composition upon said shaped dough piece;
(d) closing said dough piece such that said filling composition is wholly enclosed within said casing;
(e) heating said casing and enclosed filling to ensure their temporary sterilization and to impart to said enclosed filling a water activity in the range from 0.90 to 0.99, said casing having a water activity in the range from 0.60 to 0.95; and
(f) wholly enclosing said casing and enclosed filling in a sterile moisture-proof wrapping, said wrapped product thus being microbially stable and having a long shelf life at ambient temperature, said casing and enclosed filling being microbially unstable when devoid of said wrapping.

9. A method of manufacture of a storage-stable snack food product comprising a filling wholly enclosed in an outer casing component, comprising the steps of:
(a) forming an outer casing by shaping a piece of bread dough into a tubular component;
(b) subjecting said tubular component to a proving step;
(c) inserting a shaped filling component into said tubular component;
(d) closing at least one end of the casing so that the filling component is wholly enclosed within said casing;
(e) heating the resultant said casing and enclosed filling to ensure their temporary sterilization and to impart to said enclosed filling a water activity in the range from 0.90 to 0.99 said casing having a activity in the range from 0.60 to 0.95; and
(f) wholly enclosing said casing and enclosed filling in a sterile moisture-proof wrapping, said product thus being rendered microbially stable and having a long shelf life at ambient temperature, said casing and enclosed filling being microbially unstable when devoid of said wrapping.

10. A method according to claim 8, wherein an edible barrier layer is provided between the casing and the filling by disposing upon the interior of the casing, prior to said depositing step, a composition capable of forming a barrier to moisture.

11. A method according to claim 9, wherein an edible barrier layer is provided between the casing and the filling by depositing upon the exterior of the shaped filling component, prior to said inserting step, a composition capable of forming a barrier to moisture.

12. A method according to claim 11, wherein said composition capable of forming a barrier to moisture and said filling component are prepared by co-extrusion.

13. A method according to claim 9, wherein said tubular component is closed at one end prior to said inserting step.

14. A method according to claim 8, wherein said shaped dough piece is subjected to a preliminary heating step prior to said depositing step.

15. A method according to claim 14, wherein said heating steps are effective to bake said dough.

16. A method according to claim 9, wherein said wrapping is tubular in form and its ends are closed after being fitted over or around said product.

17. A method according to claim 16, wherein said wrapping is an elongated strip which is wound helically about said product.

18. A method according to claim 8, wherein said product is subjected to a gas flushing at least prior to said wrapping step.

19. A method according to claim 18, wherein said gas flushing step is effective at least to control at a predetermined level the amount of oxygen in the completed product.

20. A method according to claim 8, wherein said casing is pallet-shaped and comprises two elongated halves joined along a central plane, the filling being deposited upon at least one half, the casing being closed by mating edges of the respective halves to close said casing.

21. A method according to claim 20, wherein a composition capable of forming a barrier to moisture is applied to at least one said half of said casing before the filling is deposited.

22. A method according to claim 8, wherein said dough comprises flour and yeast.

* * * * *